No. 780,022. PATENTED JAN. 17, 1905.
G. F. BRYAN.
COMBINED GAS HEATER AND LAMP.
APPLICATION FILED FEB. 8, 1904.
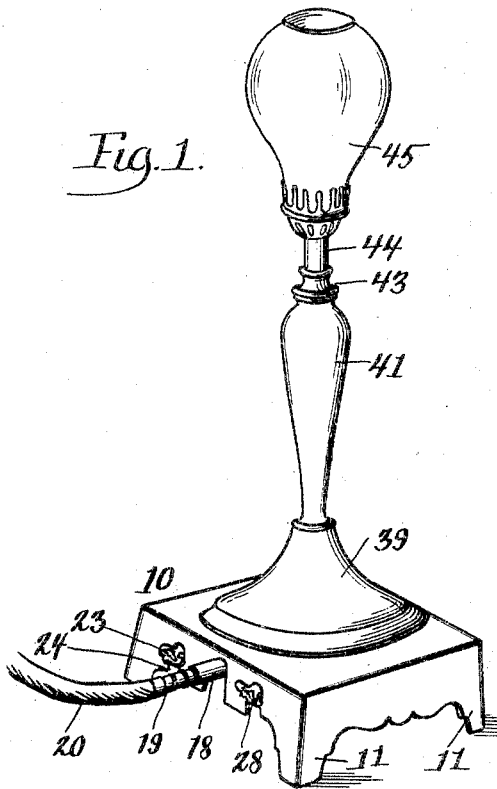
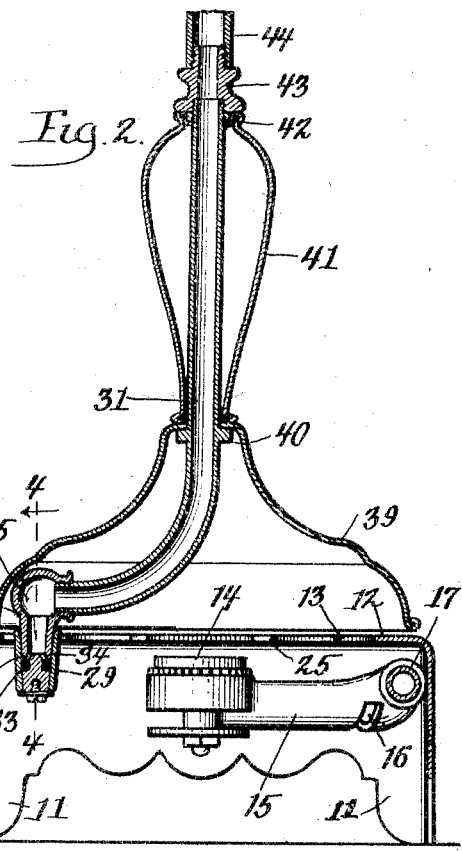
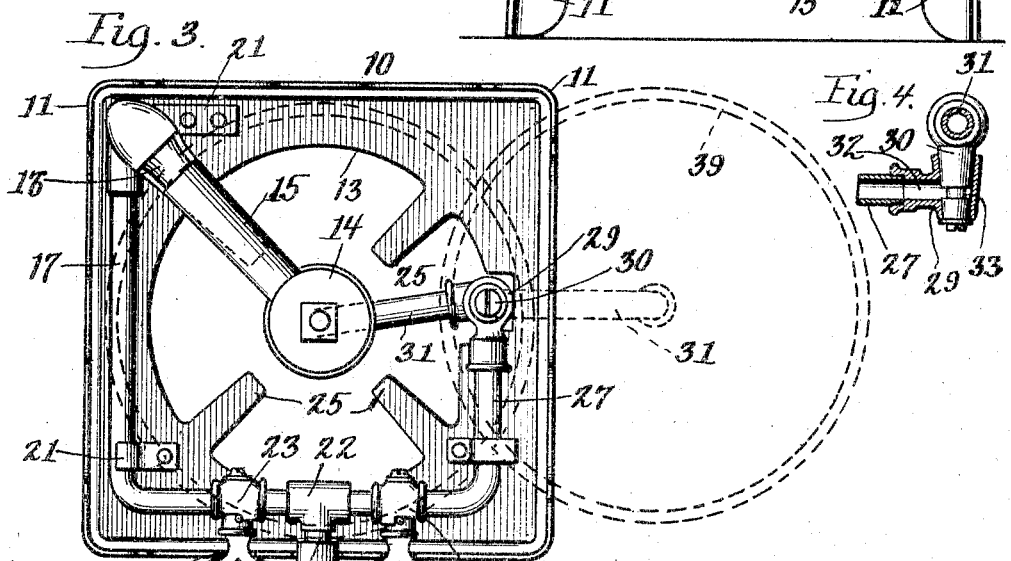
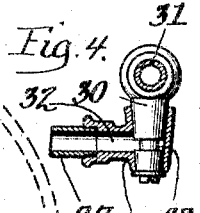
Inventor:
George F. Bryan
By Fred Gerlach
his Attorney No. 780,022. Patented January 17, 1905.

UNITED STATES PATENT OFFICE.

GEORGE F. BRYAN, OF CHICAGO, ILLINOIS, ASSIGNOR OF ONE-HALF TO MICHAEL M. RINECK, OF CHICAGO, ILLINOIS.

COMBINED GAS HEATER AND LAMP.

SPECIFICATION forming part of Letters Patent No. 780,022, dated January 17, 1905.

Application filed February 8, 1904. Serial No. 192,500.

*To all whom it may concern:*

Be it known that I, GEORGE F. BRYAN, residing at Chicago, in the county of Cook and State of Illinois, have invented certain new and useful Improvements in a Combined Gas Heater and Lamp, of which the following is a full, clear, and exact description.

The invention designs to provide a device which comprises a heater and a superposed gas-lamp sustained in a portable base or support, the lamp being movably connected to the support so it can be shifted away from the burner of the heater, so a vessel can be supported above the burner and subjected to heat issuing from the burner.

The invention consists in the several novel features hereinafter set forth, and more particularly defined by claims at the conclusion hereof.

In the drawings, Figure 1 is a perspective of a combined heater and lamp embodying the invention. Fig. 2 is a central vertical section on a somewhat larger scale. Fig. 3 is an inverted plan. Fig. 4 is a detail section on line 4 4 of Fig. 2.

A portable base 10 comprises legs 11 and a top plate 12, having an opening 13 therein. Centrally within said base and beneath said top a gas-burner 14 is sustained, which may be of any suitable construction and is secured in proper position by a diagonally-extending burner-tube 15, having an air-inlet 16 therein. Tube 15 is connected to a branch 17 of a gas induction or supply, comprising a pipe 18, which is connected by a coupling 19 to one end of a flexible pipe 20, which has its other end connected to a gas outlet or fixture, as usual in portable lamps. Branch 17 is secured within and to the portable base by brackets 21 and extends along one side of the base and along the front thereof, where it is connected by a coupling 22 with the supply-pipe. A cock 23 controls passage of gas through branch 17 and to the heater. The body of cock 23 is arranged within the base, and the handle thereof extends through a slot 24 in the front side of the base, so the handle can be easily manipulated. Projecting fingers or lugs 25 serve as supports whereon a vessel can rest. A branch pipe 27 is also connected to the gas-supply by coupling 22 and conducts gas to a superposed gas-lamp, which is movably sustained above the heater and base. A cock 28 controls passage of gas through branch pipe 27 and to the lamp. A swivel pipe-coupling, comprising a casing 29, connected to branch 27 at one side of and within the base, and a plug 30, fitting in said casing and connected to a pipe-standard 31, constitutes a pivotal connection, which permits lateral movement of the lamp-carrying standard. Pipe 27 conducts gas to a port 32 in casing 29, from which gas passes to an annular recess 33 in plug 30, and thence through ports 34 to a chamber 35 in the upper portion of plug 30, to which pipe-standard 31 is connected, which conducts gas to the lamp carried by the standard.

A cover 39 surrounds the lower portion of the pipe-standard, is designed to conceal opening 13 in the top of the portable base and the heater, is secured by a shoulder 40 to the pipe-standard, and is movable laterally with the standard. The lower portion of standard 31 is bent, so the lamp carried by the standard will be eccentrically disposed with respect to the swivel connection and can be swung away from the heater. An ornamental jacket 41 incloses the upper portion of the pipe-standard and is secured thereto by a nut 42, which holds the jacket against cover 39. A nipple 43 is connected by screw-thread with the upper terminal of the pipe-standard, and to this nipple is connected the burner-tube 44 of an incandescent or other suitable gas-lamp 45 of usual construction.

When the lamp alone is to be used, the pipe-standard and parts carried thereby will be in position seen in Figs. 1 and 2. The heater will then be entirely concealed by cover 39, and the device will have the general appearance of a portable table-lamp. When the heater is to be used, the pipe-standard and lamp carried thereby will be swung laterally into position indicated by dotted lines, Fig. 3. The heater will then be exposed, and a vessel placed on the base will be sustained over burner 14 by the base and lugs 25, and the lamp will be positioned at the side of the base so it will not interfere with the use of the heater and so heat from the burner will not be in close proximity or immediately beneath the lamp.

The swivel connection between branch 27 and standard 39 is constructed so gas-flow to the lamp is not interrupted at said connection when the pipe-standard is swung away from the heater and so the lamp and heater can both be used simultaneously. Cocks 23 28 separately control gas-flow to the heater and the lamp, respectively, so either can be used when desired.

The device is simple in construction and provides a portable combined heater and lamp which can be conveniently used on a table and other places and which occupies the space of a portable lamp of usual construction.

The invention is not to be understood as restricted to the embodiment shown and described, because the details thereof can be modified by the skilled mechanic without departing from the spirit and scope of the invention.

Having thus described the invention, what I claim as new, and desire to secure by Letters Patent, is—

1. In a combined gas heater and lamp, the combination with a base, and a heating-burner sustained thereby, of a supply-pipe, a lamp-support comprising a pipe-standard, mounted above the base and laterally movable, and a connection between the standard and the supply which permits movement of the standard away from the burner.

2. In a combined gas heater and lamp, the combination with a base, and a heating-burner sustained thereby, of a supply-pipe, a lamp-support comprising a pipe-standard, mounted above the base and laterally movable and a pivotal connection sustaining the standard between the supply and the standard and permitting the standard to be swung laterally away from the burner.

3. In a combined gas heater and lamp, the combination with a base, and a heating-burner sustained thereby, of a supply-pipe, a lamp-support comprising a pipe-standard and a laterally-movable cover, mounted above said burner, and a connection between the standard and the supply which permits the standard to be moved away from the burner, said cover, when in position above the burner, concealing the burner beneath.

4. In a combined gas heater and lamp, the combination with a base, and a heating-burner sustained thereby, of a supply-pipe, a lamp-support comprising a pipe-standard and a laterally-movable cover, mounted above said burner and a pivotal connection between the supply and the standard, permitting the standard and cover to be swung laterally away from the burner.

5. In a combined gas heater and lamp, the combination with a heating-burner, and a base extending around said burner and provided with an opening beneath which said burner is sustained, of a lamp-support comprising a pipe-standard, and a cover, a supply-pipe and a pivotal connection between the supply and the standard, permitting the cover and standard to be swung laterally, when in position above the burner, away from the opening and burner, said cover being arranged to overlie said opening and burner in one of its positions.

6. In a combined gas heater and lamp, the combination with a base, a supply-pipe and a heating-burner lying beneath or within said base of a pipe-standard, adapted for connection with a lamp at its upper end, a pivotal connection permitting the standard to be swung laterally away from said burner, said supply-pipe comprising branches leading respectively to said burner and to said standard, and cocks respectively controlling passage of gas to said standard and to said burner.

7. In a combined gas heater and lamp, the combination with a base having an opening in the top thereof, a supply-pipe, and a heating-burner lying within said base and beneath said opening, of a pipe-standard adapted for connection with a lamp at its upper end, a cover adapted to overlie said burner and opening and secured to said standard, a pivotal connection permitting the standard to be swung laterally away from said burner and opening, said supply-pipe comprising branches leading respectively to said pivotal connection and to the burner, and lying within said base, a cock controlling passage of gas to said lamp, and a cock controlling passage of gas to the burner.

GEORGE F. BRYAN.

Witnesses:
FRED GERLACH,
MICHAEL M. RINECK.